(No Model.)
J. JACOBS.
ILLUMINATING GRATING.
No. 596,882. Patented Jan. 4, 1898.
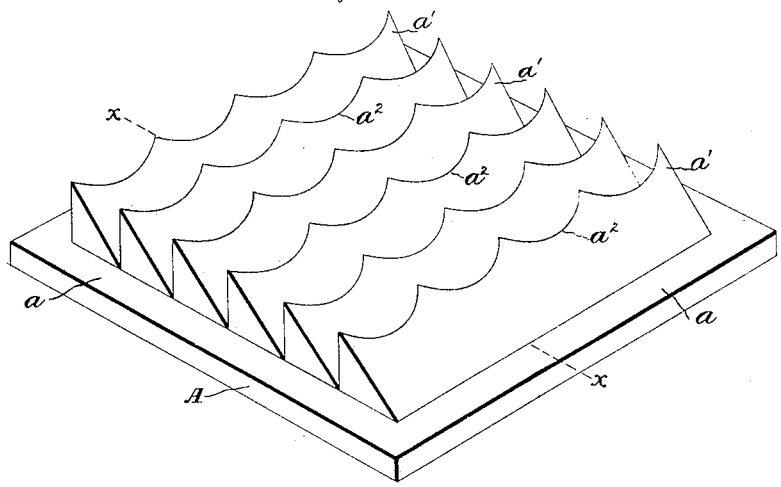
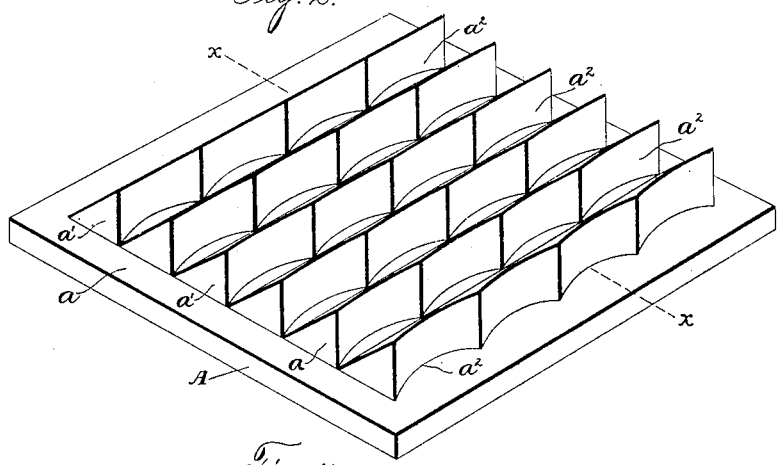
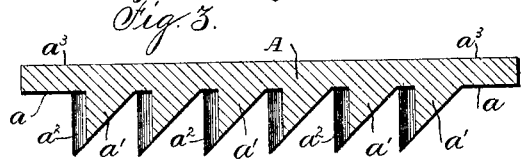
Witnesses
Frank P. Prindle.
Henry C. Hazard.
Inventor
Jacob Jacobs, by
Prindle & Russell, his Attys.

UNITED STATES PATENT OFFICE.

JACOB JACOBS, OF BROOKLYN, NEW YORK.

ILLUMINATING-GRATING.

SPECIFICATION forming part of Letters Patent No. 596,882, dated January 4, 1898.

Application filed March 18, 1897. Serial No. 628,209. (No model.)

*To all whom it may concern:*

Be it known that I, JACOB JACOBS, of Brooklyn, in the county of Kings, and in the State of New York, have invented certain new and useful Improvements in Illuminating-Gratings; and I do hereby declare that the following is a full, clear, and exact description thereof, reference being had to the accompanying drawings, in which—

Figure 1 is a perspective view of my lens from the rear and from the side of the plane faces of the ribs. Fig. 2 is a like view of the same from the side of the scalloped faces of such ribs, and Fig. 3 is a section of said lens upon lines $x\ x$ of Figs. 1 and 2.

Letters of like name and kind refer to like parts in each of the figures.

The object of my invention is to enable rays of light which pass through lenses into an interior space to be diffused; and to such end my invention consists in the conformation of the faces of the lens, substantially as and for the purpose hereinafter specified.

My improved lens A has, preferably, a rectangular form in plan view, and within the seating margin $a$ upon its rear face is provided with a series of parallel transversely-arranged $\Lambda$-shaped ribs $a'$ and $a'$, which in cross-section have one face at a right angle to the plane of the lens and the other face at an angle of about forty-five degrees with relation to such plane. The last-named face is longitudinally straight, while the opposite face is formed transversely by a series of scallops $a^2\ a^2$, as shown. The outer face $a^3$ of the lens is plane.

As thus constructed, light-rays passing inward through the lens will be reflected laterally and upward by each of the curved surfaces of the scallops $a^2\ a^2$ and be thereby more widely diffused than would be practicable by other constructions of reflecting-surfaces.

Having thus described my invention, what I claim is—

1. A lens provided with a projection that is angular in cross-section, one of the faces of which is perpendicular to the surface of the lens and has its surface formed into one or more concavities, and the other face is a plane surface and inclines relative to the lens-surface, substantially as and for the purpose specified.

2. A lens provided with parallel angular projections, one of the faces of each of which extends perpendicular to the surface of the lens, and has one or more concavities, and the other of the faces inclines with reference to the lens-surface, and is plane, substantially as and for the purpose described.

In testimony that I claim the foregoing I have hereunto set my hand this 16th day of March, 1897.

JACOB JACOBS.

Witnesses:
FRANK P. PRINDLE,
JAS. E. HUTCHINSON.